United States Patent [19]

Reese et al.

[11] 4,437,213
[45] Mar. 20, 1984

[54] MEANS FOR TENON-FORMING A SHROUD TO A TURBINE ROTOR

[75] Inventors: Ira W. Reese, Trenton; Nello B. Compagnucci, Yardville, both of N.J.

[73] Assignee: Transamerica DeLaval Inc., Princeton, N.J.

[21] Appl. No.: 409,600

[22] Filed: Aug. 19, 1982

[51] Int. Cl.³ ............................................. B23P 23/04
[52] U.S. Cl. .................................. 29/33 K; 29/34 R; 29/34 B; 29/243.54; 219/10.59
[58] Field of Search ..................... 29/156.8 B, 156.8 T, 29/33 K, 34 B, 23.5, 522 A, 156.4 R, 34 R, 283.5; 72/342; 219/10.57

[56] References Cited

U.S. PATENT DOCUMENTS

| | | | |
|---|---|---|---|
| 2,135,040 | 11/1938 | Morgan et al. | 29/23.5 X |
| 2,383,992 | 9/1945 | Sherman | 219/10.57 |
| 2,996,788 | 8/1961 | Austin et al. | 29/23.5 |
| 3,393,436 | 7/1968 | Blackhurst et al. | 29/156.8 B |
| 3,848,863 | 11/1974 | Owen | 269/296 X |
| 4,078,290 | 3/1978 | Fletcher et al. | 29/252 |
| 4,141,124 | 2/1979 | Ryan | 29/156.8 B |
| 4,155,152 | 5/1979 | Cretella et al. | 29/156.8 B |
| 4,400,915 | 8/1983 | Arrigoni | 29/156.8 B |

FOREIGN PATENT DOCUMENTS 583863 12/1977 U.S.S.R. .............................. 72/342

*Primary Examiner*—William R. Briggs
*Assistant Examiner*—Glenn L. Webb
*Attorney, Agent, or Firm*—Hopgood, Calimafde, Kalil, Blaustein & Judlowe

[57] ABSTRACT

The invention contemplates a technique and machine for completing the assembly of a turbine-rotor stage by precision-peening blade tenons to secure shroud segments to successive blades. In the machine, a turbine-rotor assembly of multiple stages of blades on a rotor shaft is mounted on a horizontal axis, with provision for indexing successive blade tenons of a given-stage into precise horizontal confrontation with tool elements successively presented to the tenon, the tool elements being independently mounted to a compound-axis slide system. A presser foot carried by the slide system locally holds the shroud segment to a seated position against the blade to be secured, while first an induction-heating element and then a riveting tool perform in programmed sequence upon the exposed end of the involved tenon. The compound action of the slide system enables (a) reciprocated horizontal displacement of the tools in and out of operating position, tool action being on a horizontal axis of symmetry which geometrically intersects the turbine-rotor axis, while operating upon the blades of a first turbine stage, and (b) orthogonal offsetting displacement of the slide system and its tools, in order to proceed with a succession of similar shroud-riveting operations at a succeeding stage of the rotor.

24 Claims, 8 Drawing Figures

MEANS FOR TENON-FORMING A SHROUD TO A TURBINE ROTOR

BACKGROUND OF THE INVENTION

The invention relates to a method and means for assembling shroud segments to successive groups of blades in turbine-rotor stages.

The blades of given stages of a turbine rotor are first assembled to the shaft or hub portion serving the particular stage. The radially outer end of each blade is characterized by a short cylindrical tenon, which projects radially beyond the shoulder at termination of the foil section of the blade. An arcuate shroud segment has preformed apertures for reception of a succession of blade tenons, to define their fixed angular spacing when the tenons have been deformed into locked engagement to the shroud segment. A high-speed turbine rotor must be well balanced and the blade tenons must be properly secured if quality performance and durability are to be realized. Traditionally, this has been an art, exercised by skilled workers with impact-riveting action on successive tenons. Yet, however skilled the worker, it has been well-nigh impossible to achieve total uniformity, so that life and performance have suffered. Careless rivet-tool impact of the shroud segment induces distortion and sets the stage for something less than optimum performance.

BRIEF STATEMENT OF THE INVENTION

It is an object of the invention to provide an improved method and means for avoiding or substantially eliminating problems arising in assembly of shroud segments to turbine-rotor blades.

Another object is to provide a precision machine which reduces the level of skill required for assembly of shroud segments to turbine-rotor blades, while at the same time enabling production of superior turbine-rotor stages.

A specific object is to achieve the foregoing objects in an automatic cycle of local heat development and uniform peening of each successive tenon end, without risk of impairment of the involved shroud segment, whereby the peening of all tenons in each stage of the turbine rotor can be assuredly uniform.

Another specific object is to achieve the foregoing specific object with an axis of peening symmetry which is geometrically in radial alignment with the rotor axis.

The invention achieves the above objects by providing rugged stabilizing support of a turbine rotor shaft on a horizontal axis, the shaft having been assembled with blades in its various stages and requiring shroud fastening of blade tenons to complete the rotor. The shaft support is provided with a precision slow-speed drive for indexing incremental rotation of the rotor shaft, to bring successive tenons of a given stage into precise horizontal confrontation with tool elements successively presented to the involved tenon. The tool elements are independently mounted to a compound-axis slide system. A presser foot carried by the slide system locally holds the shroud segment to a seated position against the blade to be secured, while first an induction-heating element and then a riveting tool perform in programmed sequence upon the exposed end of the involved tenon. The compound action of the slide system enables (a) reciprocated horizontal displacement of the tools in and out of operating position, tool action being on a horizontal axis of symmetry which geometrically intersects the turbine-rotor axis, while operating upon the blades of a first turbine stage, and (b) orthogonal offsetting displacement of the slide system and its tools, in order to proceed with a succession of similar shroud-riveting operations at a succeeding stage of the rotor.

The induction-heating element is so devised, positioned and excited as to locally heat only the end of the tenon, and only the region requiring peened deformation; and application of riveting action occurs before noticeable loss of heat to the remainder of the involved tenon. Importantly, there is insignificant heating of nearby regions of the involved shroud segment, and there is no riveting or peening-tool contact with the shroud segment.

DETAILED DESCRIPTION

A preferred embodiment of the invention will be illustratively described in conjunction with the accompanying drawings. In said drawings.

Figure 1:
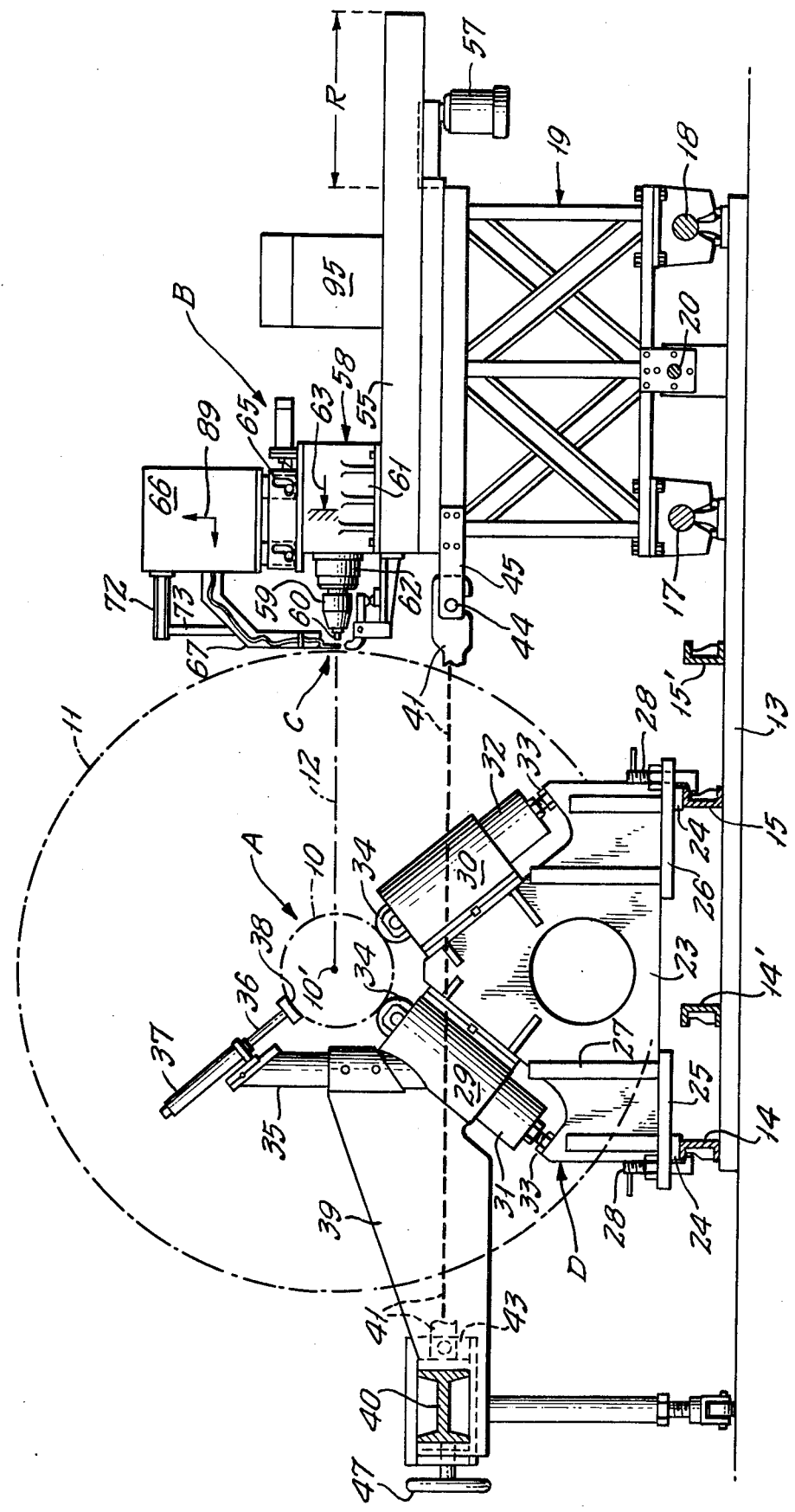
FIG. 1 is a view in elevation of a shroud-riveting machine, as seen from the operator's side.

In FIG. 1, the tenon-riveting machine is shown to comprise means A at one end for horizontal-axis support and incremental indexing of a turbine rotor shaft 10 to which plural stages of blades (not shown in FIG. 1) have been assembled, for shroud-peening along an outer circumferential locus suggested by phantom outline 11. At the other end of the machine, a two-axis or compound-action slide system B supports tooling C for operation upon successive blade tenons of a given rotor stage, on a horizontal axis 12 of working symmetry, the axis 12 being aligned radially with respect to the rotor axis 10'. The structures A and B are both floor-mounted, being shown served by a single bed or floor plate 13.

Figure 2:
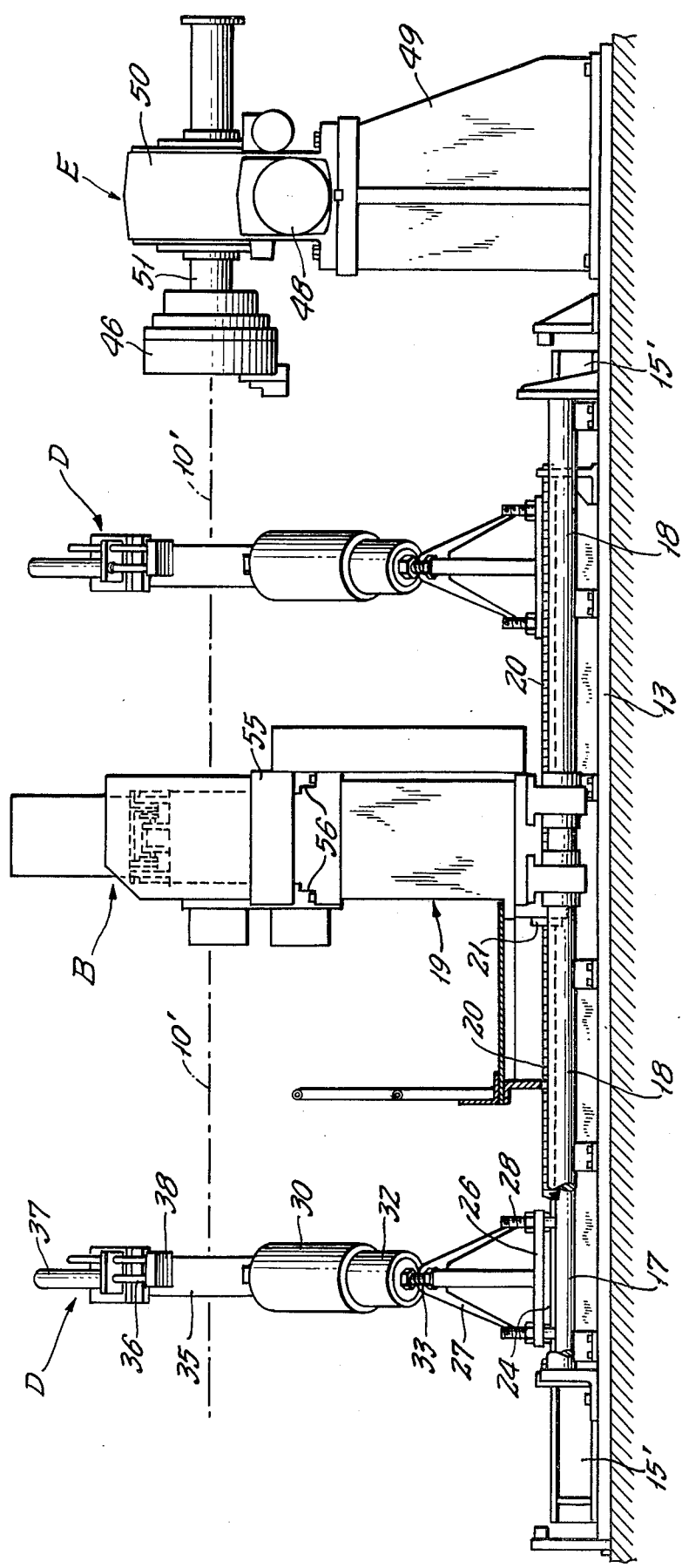
FIG. 2 is a side view in elevation of the machine of FIG. 1, as seen from the right end of FIG. 1.
Figure 3:
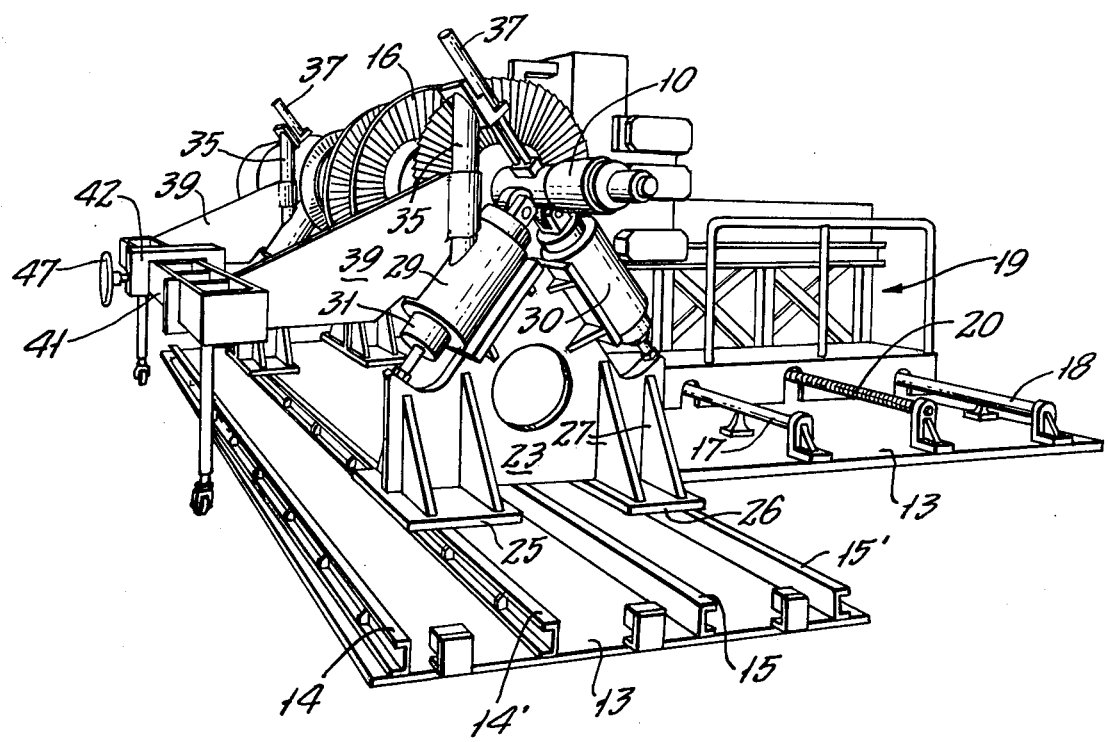
FIG. 3 is a fragmentary view in perspective showing primarily the turbine-rotor supporting end of the machine.

With additional reference to FIG. 2, the means A of rotor-support and indexing drive are seen to comprise two like rotor-support units D-D' and an end-drive unit E. The rotor-support units D-D' are adjustably positionable along a pair of fixed parallel rails 14-15 which extend parallel to the rotor axis. The rail pair 14-15 is one of two pairs, the other (14'-15') of which is also parallel to the rotor axis, but at offset from the rail pair 14-15, to enable tool working upon rotor stages of lesser outside diameter; in FIG. 1, the support of rotor 10 utilizes the outer rail pair 14-15 due to the relatively large diameter of the stage 11 illustrated, and in FIG. 3, the inner rail pair 14'-15' provides such support, to illustrate use of the machine upon a relatively small diameter stage 16. A further fixed pair of rails 17-18, parallel to rails 14-15, supports the main carriage 19 of the tool-carrying means B, with an elongate lead screw 20 in fixed parallel relation between rails 17-18. A motor-driven nut 21 mounted to carriage 19 is continuously engaged to lead screw 20 and provides means of selective positioning of the tool-carrying means B along rails 17-18, as when transferring tool operations from one to another of the stages of a partially completed rotor. In FIG. 2, the tool-carrying means B is seen to have been positioned on rails 17-18 at a stage location between the adjustably positionable turbine-rotor support units D-D'.

The support units D-D' are duplicates of each other and therefore only one (D) need be described. An upstanding pedestal plate or frame 23 stands on shoes 24 mounted to spaced base plates 25-26, and front and back corner braces as at 27 stabilize the upright orientation of plate 23; shoes 24 are slidably guided on rails 14-15, and manually operable means 28 secure a selected unit-D location, by clamping to the upper flange of the involved rail 14(15). Plate 23 is centrally profiled to establish symmetrically opposed inclined support for guide sleeves 29-30 within which cylindrical members 31-32 are axially adjustably positioned, by the jack action of lock bolts 33 carried at the lower ends of members 31-32. Bolts 33 have reaction abutment with corner ledges in the upper profile of plate 23, and rollers 34 at the upper ends of members 31-32 have symmetrically opposed local supporting engagement with the rotor shaft 10. Shoes 24, base plates 25-26, upstanding plate 23 and sleeves 29-30 will be understood to be consolidated into a single welded and suitably braced component, and members 31-32 will be understood to be keyed to their respective guide sleeves, to assure pure rolling contact at the locale of rotor-shaft support. An upright arm 35 welded to sleeve 29 is truncated at its upper end to establish alignment of a clamp rod 36 in diametrically opposed relation to member 32. Rod 36 forms part of fluid-pressure operable means 37 for clamped application of a friction shoe 38 to shaft 10, once a desired angular indexing of the rotor has been effected, thereby assuring firm rotor support during a tenon-peening cycle.

In order to assure that rotor axis 10' will be horizontally stabilized in the course of peen-action thrust along axis 12, a side brace 39 is secured to sleeve 29 and arm 35. Brace 39 extends for laterally offset locating engagement with the respective flanges of an I-beam 40. Beam 40 is horizontally elongate, parallel to rails 14-15, and derives end support from spaced legs which are shown with casters to ride flooring adjacent to base plate 13. Each of the rotor-support units D-D' will be understood to include its own side brace 39, thereby ensuring I-beam (40) stabilization of both units D-D', on opposite sides of the horizontal axis 12 of tool-working thrust. To stabilize I-beam 40 against displacement in reaction to such thrust, a horizontal tie rod 41 establishes removably linked connection between the main carriage 19 and I-beam 40. As shown, a rectangular hook or yoke structure 42 straddles I-beam 40 at the longitudinal location of tie-rod (41) connection, and structure 42 is slidably positionable along I-beam 40, with a measure of clearance, for ease of slidable positioning, and for ease of making tie-rod (41) connections. A removable pin 43 connects structure 42 to one end of rod 41, and at the other end of rod 41 a downwardly open hook formation is removably engageable to a horizontal bar 44 between spaced arms 45 which have rigid connection to carriage 19; for clarity in FIG. 1, rod 41 is shown by a heavy dashed alignment, between its described end connections.

In setting up the machine, a multiple-stage turbine rotor is first suitably mounted, with its shaft 10 supported by rolls 34 at both supports D and D', and with one end of shaft 10 clamped in a lathe chuck 46 forming part of end-drive unit E. The carriage 19 is then driven via means 20-21 until its tool-working axis 12 is positioned in the geometrical radial plane of tenon centers, for the turbine stage (the work stage) at which shroud elements are to be assembled to the tenons. Slide structure 42 is then positioned on I-beam 40 for pin location of tie rod 41 in a vertical plane (1) offset to one side of the work stage, and (2) in the space between the work stage and one of the next-adjacent stages. The pin connection 43 and the hook connection at 44 are then made, and the hand wheel 47 of a screw jack carried by slide structure 42 is turned for local jack-screw abutment with I-beam 40, until all clearances have been taken up and tool thrust on axis 12 can be absorbed by essentially unyielding reference to carriage 19.

Before proceeding with tool description, it will be noted that drive unit E may comprise an electric motor 48 on a pedestal 49 which also supports reduction gearing 50 to an output shaft 51 for chuck 46. A marine-turbine gear-reduction unit (at 50) having a reduction ratio of 34,000:1 serves admirably for slow indexing rotation of the turbine-rotor shaft 10, to precisely position each successive tenon in alignment with the tool-working axis 12. And it will be understood that pressure-operated means 37 at each of the support units D-D' is retracted to free shaft 10 for indexing rotation and that it applies continuous clamp action to shaft 10 during tool-working on a given tenon.

It has been indicated that unit B provides two-axis or compound-action slide support for the tooling C. The first component of such action is provided by the described rail (17-18) and motor-driven (20-21) system for selectively positioning carriage 19, as appropriate for operations at the current work stage. The second component involves a secondary or cross slide 55, guided by linear ways 56 on carriage 19 for developing displacement of the tooling on its working axis 12, i.e., purely radial displacement with respect to the rotor-shaft axis 10'. The range R of such displacement is indicated by legend in FIG. 1 and will be understood to be of sufficient extent to enable set-up positioning of tooling C (radially of the axis 10') to the extent appropriate for the shroud-circle diameter of the particular stage upon which peening work is currently to proceed. Drive for effecting set-up displacements within the range R will be understood to derive from a reversible electric motor 57 having reduction coupling to lead-screw means (not shown), which is preferably of the ball-screw variety, with substantial preload, as to 5,000 lbs.

The forward end of slide 55 is shown carrying a noiseless rotary riveting machine 58 which may be a commercially available nutating device, as for example, a riveting head manufactured by Taumel Noiseless Riveters, Inc. of Elmsford, N.Y. It suffices here to say that such a tool comprises a tool-holder or chuck 59 for support of a riveting bit 60 and motor means contained within a housing 61 for providing the necessary rotary input to nutation mechanism 62, the eccentrically gyrated output shaft of which carries chuck 59. Through such mechanism, the common axis of chuck 59 and of its bit 60 is caused to cyclically generate a geometrical cone, the apex of which is a point on the drive-motor axis. The outer end of bit 60 is the working region, operative upon the end of a blade tenon in the course of its eccentric gyrations. At this working region, the radius of eccentric gyration is preferably in the range of 75 to 100 percent of the diameter of the tenon, and the eccentric gyration is at elevated speed, in the order of 1800 rpm. The housing 61 will be understood further to contain means whereby the nutating bit 60 executes an automatic cycle of forward feed into working contact with a tenon end, followed by a continuous hydraulic loading with about 5000 lbs. of thrust up to achievement of an adjustably predetermined precision stop position, whereupon the tool bit and its chuck retract to await initiation of their next cycle of operation; the motion to such a precision stop is symbolized at 63 in FIG. 1.

Figure 5:
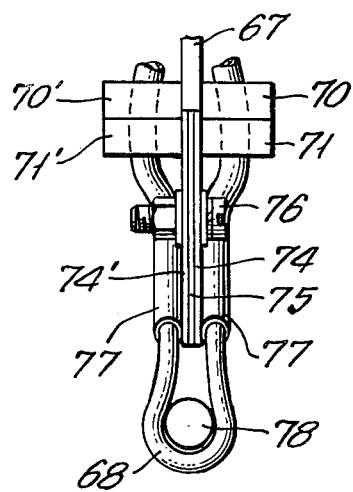
FIGS. 5 and 6 are further-enlarged front and side views of an induction-heater element of FIG. 4.
Figure 6:
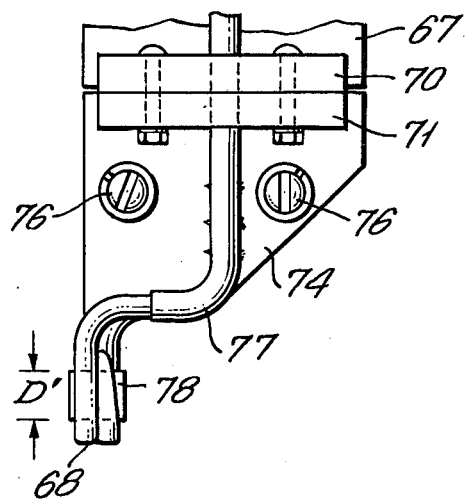

Mounted upon housing 61 for the riveting tool is cam-guided support structure 65 for an induction-heater system, the power supply and displacement controls of which are contained within a housing 66. A dog-leg plate 67 carried by housing 66 extends forward and down to enable accurate positioning of an induction-heating element 68 immediately beneath and slightly forward of the lower end of plate 67. Heating element 68 is of conductive tubing (e.g., copper) and is supplied by tubular leads 69 mounted to plate 67; and as seen in FIGS. 5 and 6, element 68 is part of a subassembly detachably carried via flanges 70-71 (and 70'-71') at the lower end of plate 67. The operative part of element 68 is a turn or turns of the conductive tubing, the inside diameter of the turns being such as to enable some overlap with the projecting end of a tenon to be peened. Suspension-arm means 72 mounted to housing 66 provides stiff outboard reference for a strut-suspension connection 73 to plate 67.

More particularly, the dog-leg plate 67 may be of metal such as aluminum in which case it will be understood to be suitably clad with insulating material; preferably, plate 67 is of stiff insulating material such as glass-fiber reinforced plastic (such as an epoxy or a phenolic) board. Its lower end terminates with blocks 70-70' which define upper flanges for removable attachment of the corresponding flanges 71-71' of the heating-element subassembly. The heating-element subassembly is shown to comprise two matching metal plates 74-74' and an insulating spacer 75, bolted at 76 to preserve electrical isolation of plates 74-74' with respect to each other. A lead tube 77 (77') is brazed to each plate 74 (74'), and the respective lead ends of element 68 are conductively united to the lead tubes 77-77'. The lead tubes 77-77' will be understood to be conductively united to the respective lead 69-69', and a continuous coolant conduit will be understood to have been established by parts 69-77-68-77'-69' for continuous circulation of coolant liquid under control of suitable means within housing 66.

Figure 7:
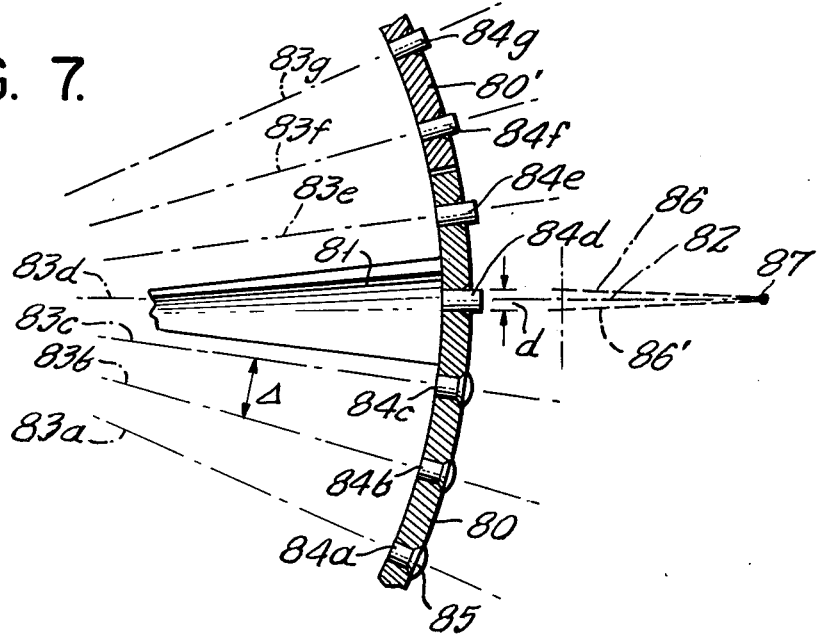
FIG. 7 is an enlarged and simplified fragmentary diagram to illustrate operation in the working region of the machine.

The coil of element 68 is shown to comprise slightly less than two full turns of its tubing, being sized with its internal diameter $D'$ appropriate to the tenon size and desired rivet contour, as will become more clear in discussion of FIG. 7. Finally, and also depending upon ultimately riveted desiderata, a cylindrical core 78 of magnetic flux conducting material, as of sintered suitable ferrite, is shown fitted to the bore diameter $D'$ of element 68; the length of core 78 preferably slightly exceeds the axial length of coil 68, thus enabling core 78 to have contour-conforming contact with the projecting end of a tenon to be peened. It will be understood that, upon oscillating excitation of element 68, core 78 serves to concentrate flux with uniform distribution at only the projecting end of the tenon it has contacted, thus localizing a tenon region which can become sufficiently malleable to be swaged by the described axially loaded orbital riveting action of tool-bit engagement.

FIG. 7 is a simplified sketch showing the working region within the described machine. In the fragment of FIG. 7, a first shroud-band element 80 and a second adjacent such element (80') have been assembled to cylindrical tenons of successive blades 81 of rotor stage 16; for simplicity, only the blade 81 which has just been indexed into the working alignment with the axis of orbital symmetry 82 has been shown in full lines, adjacent blades being only suggested by phantom alignments of their respective tenon axes $83a \ldots 83g$, and corresponding tenons being identified $84a \ldots 84g$. Shroud-band elements 80-80' have been preformed with radial bores to accommodate assembly to successive groups of tenons, element 80 being shown serving tenons $84a \ldots 84e$, and element 80' being shown serving tenons $84f$ and $84g$. For the illustrative situation of FIG. 7, the volume of tenon material projecting beyond adjacent shroud body is slightly in excess of the volume of the annular frustum of the geometrical cone established between the tenon and adjacent countersink contour of the outer end of the radial bore. Riveting thus produces a smoothly rounded crown as at 85 for the fully riveted tenons $84a \ldots 84c$, and the tenon $84d$ at working alignment 82 is about to be similarly swaged into the same crowned contour, to be followed by indexing and similar crowning of tenons $84e \ldots 84g$ in successive cycles of operation.

FIG. 7 also serves to illustrate the conical swath through which the orbiting chuck gyrates in the course of riveting action. Phantom lines 86-86' identify upper and lower diametrically opposite limits of such gyration, centered at 87.

Figure 4:
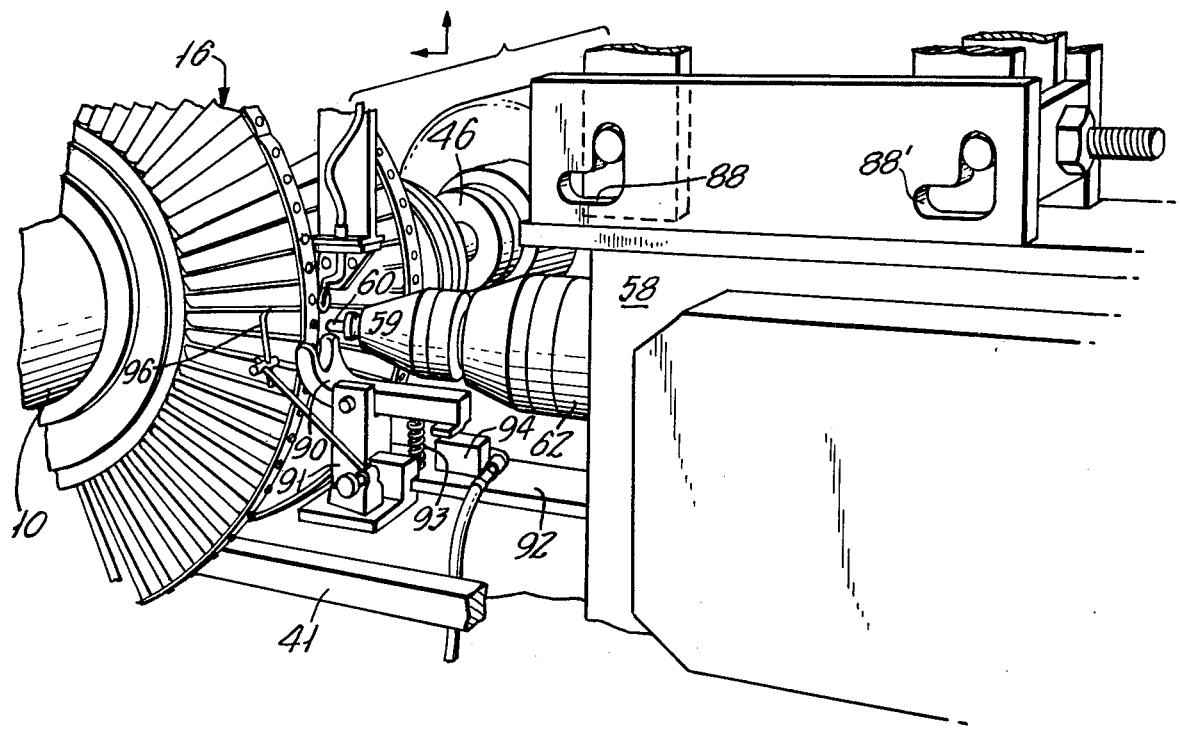
FIG. 4 is an enlarged fragmentary view in perspective, showing the tool-operating region of the machine.
Figure 8:
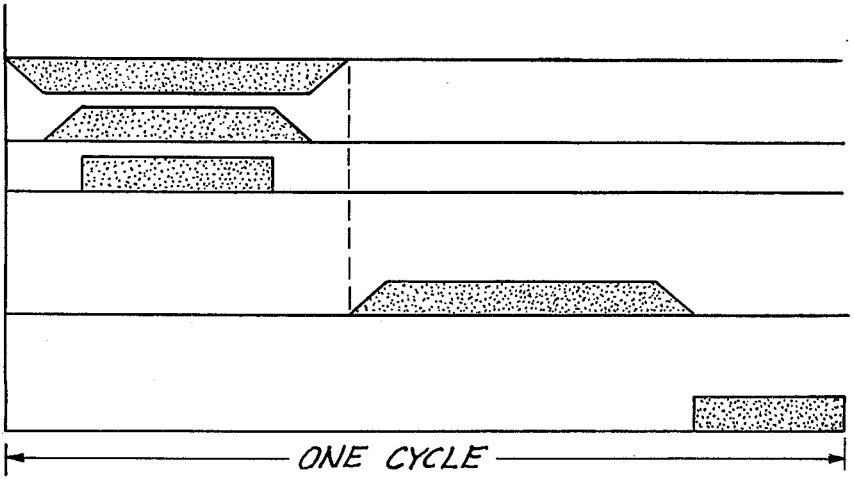
FIG. 8 is a diagram graphically depicting coordinated operations within a tenon-riveting cycle of the machine.

FIG. 8 is useful in discussing one cycle of riveting operations of the described machine, starting when blade 81 has been indexed into working position, with its tenon $84d$ aligned with the horizontal working axis 82, it being understood that both heating element 68 and tool bit 60 are in their retracted positions. It is preferable that unsecured tenon-shroud engagements be subject to continuous loading of the relevant shroud region into radially inwardly driven firm abutment with the blade shoulder at the root of the applicable tenon. As shown, this is accomplished by a presser foot 90 in the form of a forked lever, pivoted on a pedestal 91 which is attached by a suitable bracket 92 to the forward end of the secondary slide 55. The forked end of lever 90 straddles the tenon $84d$, with clearance for both induction-heating and riveting operations, and a stiff compression spring 93 loads the engagement which, due to upward offset of the forked end above the pivot axis, develops a tendency of the presser foot 90 to displace (clockwise in the sense of FIG. 4) through a short lost-motion which terminates at a positive abutment, preventing further presser-foot rotation. In the course of displacement through the lost motion, a limit switch 94 associated with the abutment-stop structure is operative to safety-interlock all electrical controls, enabling all riveting cycles to proceed for a given turbine stage; without such safety interlock, tool and/or work damage might accidentally occur.

The working cycle commences under a programmed sequence determined by electrical control means and settings within a control cabinet 95 accessible to the operator, with actuated displacement of plate 67 (and therefore also heating element 68) in first a downward displacement and then an advancing displacement, placing the left end of tenon 84d (if core 78 is used, then core 78 contacts the end of the tenon); such displacement will be understood to be under control of fluid-pressure operated means (not shown) contained within or carried with housing 66, producing an L-shaped path under control of cams 88-88' (see FIG. 4) and symbolized in FIG. 1 by angled arrows at 89. Having been placed in operative position, coil 68 is excited with strong alternating current (suitably in the range of 1 to 5 kHz), to quickly develop red heat at essentially only the projecting end of tenon 94d; then, upon lapse of a predetermined short heating interval, excitation terminates and retraction (back and up) quickly clears coil 68 from the ensuing path of movement of tool bit 60. In FIG. 8, the hydraulic feed mechanism within housing 61 is seen to effect a fast advance of tool bit 60 into work contact, whereupon axial loading is operative to slowly continue the feed as peening (swaging) progresses; it will be understood that just prior to or concurrent with the initiation of orbital-head feeding, the orbital drive may be started (within housing 61) and continued as long as tool bit 60 is in its forward or working position. In due course, the fixed stop is attained, and it is satisfactory to continue the orbital action a few seconds after stop-abutment, thus permitting the controls to function from timer mechanism which times a riveting interval ascertained to be more than sufficient to attain the stopped position. At the conclusion of the timed riveting interval, the riveting head is actuated for retraction, to await the next cycle. Meanwhile, such retraction marks the instant for commencing an index of the rotor shaft 10, meaning controlled release of shaft clamps, reduction-gear drive of chuck 46, to the point of aligning the next-succeeding tenon (84e) axis with the working alignment 82. Typically, the described cycle, including indexing, is about 40 seconds, for shroud-peening to tenons of one-half inch to one-inch diameter.

In a semi-automatic operation of the machine, the cycle stops at completion of the automatically driven indexed displacement, whereupon cycle control is interrupted, awaiting the operator's inspection, as with a suitably positioned indicator instrument 96, to assure precision of the new tenon's alignment with axis 82. Controls at 95 will be understood to include provision for forward and reverse jogging excitation of the index-drive motor 48, and, when satisfied with the alignment, the operator need only touch a "start" button to initiate the next working cycle.

In an automatic operation of the machine, automatic sensing of the precision of indexed position may be performed as by light source and photocell means (not shown), in which case it will be understood that the next working cycle will be automatically initiated when the photocell output certifies attainment of the desired degree of indexing precision.

What is claimed is:

1. A tenon-forming machine for peening a blade tenon to secure a shroud band to a bladed turbine rotor, comprising means for supporting a turbine rotor on a horizontal axis at two locations offset on opposite axial sides of the axial region of a rotor stage at which shroud bands are to be secured to adjacent blades of the stage, tool-supporting means on one laterally offset side of the horizontal axis of turbine-rotor support, an elongate horizontally oriented cross-brace rail on the other lateral side of the horizontal axis of turbine-rotor support and supported by and between both rotor supports, and means including a chuck forming part of the turbine-rotor support means for engaging and selectively partially rotating a turbine rotor supported thereby; said tool-supporting means comprising a main slide and fixed horizontal ways for its travel parallel to the rotor axis, a secondary slide carried by said main slide and guided for horizontal action normal to the rotor axis, riveting means including an orbital riveting head carried by said second slide and oriented normal to the rotor axis, an induction-heating element and movable support therefor such that said element may be positioned in and out of induction-heating relation with a blade tenon in advance of a tenon-forming cycle of riveting-head action on the blade tenon, and a tie rod for selectively connecting said secondary slide to the cross-brace rail on a transverse alignment close to but offset from the rotor axis.

2. The machine of claim 1, in which said induction-heating element is a coil of inside diameter enabling local clearance with a blade tenon end when in at least partial overlap therewith.

3. The machine of claim 1, in which said induction-heating element comprises a coil of inside diameter approximating that of the blade tenon, and a core of magnetic-flux conducting material carried within said coil, whereby said core may act in conjunction with the adjacent end of a blade tenon to concentrate flux and therefore heating essentially local to the end of the tenon.

4. The machine of claim 3, in which the core end face adjacent the tenon is shaped for contour-confirming contact with the end of the tenon.

5. The machine of claim 3, in which said core is a ferrite.

6. The machine of claim 1, in which said rotor-support means comprises two spaced parallel rails parallel to the axis of rotor support, two upstanding pedestals each of which has slidably guided support on both rails, each pedestal having adjustably elevated means for supporting engagement with a rotor shaft at a different one of said two locations.

7. The machine of claim 6, in which said two spaced parallel rails comprise one of two like pairs of spaced parallel rails, said pairs being in lateral offset with respect to each other, and said pedestals being selectively mountable on either of said pairs of rails, thereby facilitating accommodation of rotor-stage diameter to said riveting head.

8. The machine of claim 1, in which said rotor-support means at each of said two locations includes two adjustably elevated devices for supporting engagement with a rotor shaft at angularly spaced locations on opposite sides of the vertical plane which includes the rotor axis.

9. The machine of claim 8, in which each of said devices comprises a guide sleeve forming a fixed part of the involved pedestal, an elongate element slidably guided by and in keyed relation to said sleeve, a rotor-engageable roller at the upper end of said element, and jack means coacting between a fixed part of said adjustable pedestal and the other end of said element.

10. The machine of claim 9, in which the roller-supporting end of said elongate element projects beyond the associated guide sleeve for all rotor-shaft diameters of a range of different-size rotors accommodated by said machine, and visible indicia of rotor-shaft size inscribed on said elongate element for enabling fast initial jack set up of the guided position of all elongate elements appropriate to a newly changed rotor-shaft size.

11. The machine of claim 1, in which presser-foot means carried by and projecting forward of said secondary slide, with yieldable loading, retains a shroud band firmly seated on the shoulder of each rotor blade while its tenon is exposed for successive steps of (1) induction-heating and (2) peening-engagement by said riveting head.

12. The machine of claim 1, in which separate motor drives and controls are provided for positioning displacement of said main slide and of said secondary slide.

13. The machine of claim 1, in which said turbine-rotor support means includes a motor-driven chuck releasably engageable with a longitudinal end of the rotor shaft, and control means for motor-excitation to drive said chuck in incrementally indexed rotary displacement.

14. The machine of claim 13, in which the motor drive to said chuck includes high-ratio reduction gearing, in the range above 10,000:1.

15. The machine of claim 14, in which said range is between 30,000:1 and 40,000:1.

16. The machine of claim 13, in which said turbine-rotor support means includes a selectively operable rotor-shaft clamp at least at one of said locations, said control means being operative to set said clamp in intervals between those rotary drive of said chuck and to release said clamp at least during intervals of rotary drive of said chuck.

17. The machine of claim 16, in which said clamp is hydraulically operated.

18. The machine of claim 16, in which said clamp is one of two, the second clamp being rotor-shaft engageable at the other of said two locations, and both clamps being concurrently operable by said control means.

19. The machine of claim 1, in which said orbital head includes a chuck adapted to removably clamp a tool bit on the chuck axis for projection beyond an axial end of the chuck, said head further including means for eccentrically gyrating said chuck about a drive axis to impart orbital motion to the projecting end of a tool bit in said chuck.

20. The machine of claim 19, in which the eccentric gyration is a nutation.

21. The machine of claim 19, in which in the eccentric gyration the locus of chuck-axis motion is a cone.

22. The machine of claim 19, in which, at the projecting end of the tool bit, the orbiting circle of the chuck axis is of radius selected in the range of 75 to 100 percent of the diameter of the tenon to be peened.

23. The machine of claim 1, in which said riveting means includes hydraulic feed means for displacing said riveting head into and out of tenon-peening position, said feed means being operative to load the tool bit in sustained advancing engagement with the tenon in the course of a peening operation.

24. The machine of claim 23, in which an adjustably fixed stop limits tool-bit advance at a location beyond that of initial peening contact with the tenon.

* * * * *